(12) United States Patent
Khosla

(10) Patent No.: US 6,431,352 B1
(45) Date of Patent: Aug. 13, 2002

(54) CONTAINER WITH HINGED COVER

(75) Inventor: Jivan Kumar Khosla, Newtown, PA (US)

(73) Assignee: United States Can Company, Lombard, IL (US)

( * ) Notice: Subject to any disclaimer, the term of this patent is extended or adjusted under 35 U.S.C. 154(b) by 28 days.

(21) Appl. No.: 09/672,656

(22) Filed: Sep. 28, 2000

(51) Int. Cl.⁷ .............................................. B65D 85/57
(52) U.S. Cl. .................................... 206/308.1; 206/310
(58) Field of Search ................................ 206/307, 309, 206/308.1, 310; 220/4.23, 4.24; 383/35; 150/150

(56) References Cited

U.S. PATENT DOCUMENTS

| | | | |
|---|---|---|---|
| 4,905,217 A | * | 2/1990 | King et al. ............... 206/308.1 |
| 5,590,768 A | * | 1/1997 | Hilton et al. ................ 206/308 |
| 5,623,980 A | * | 4/1997 | McMahon ................... 150/150 |
| 5,715,938 A | * | 2/1998 | Cheris et al. ............. 206/308.1 |
| 5,725,093 A | * | 3/1998 | Yamaguchi et al. ......... 206/309 |
| 5,788,068 A | | 8/1998 | Fraser et al. |
| 5,829,584 A | | 11/1998 | Raucci, Jr. |
| 5,894,924 A | | 4/1999 | Koch |
| 5,971,143 A | | 10/1999 | Yoshioka |
| 5,996,787 A | | 12/1999 | Kobayashi |
| 6,021,894 A | | 2/2000 | Lakoski et al. |
| 6,024,215 A | | 2/2000 | Leung |
| 6,027,186 A | | 2/2000 | Liou |
| 6,056,117 A | | 5/2000 | Courchesne |
| 6,059,102 A | | 5/2000 | Gelardi et al. |
| 6,216,862 B1 | * | 4/2001 | Chang ..................... 206/308.1 |
| 6,216,863 B1 | * | 4/2001 | Williamson et al. ...... 206/308.1 |

* cited by examiner

Primary Examiner—David T. Fidei
(74) Attorney, Agent, or Firm—Polster, Lieder, Woodruff & Lucchesi, LC

(57) ABSTRACT

A holder (10) for CDs, DVDs (D) and the like includes a plastic molded container (12) sized to accommodate the discs. Along one side (16) of the container, on an inner wall thereof, a living hinge (22) is formed. The opposite side (14) of the container has an interlocking surface. At one end (E) of the container, a slit (S) is formed which extends between the two sides of the container. By pressing against the sides of the container the slit widens into a gap (G) sufficiently wide for a disc to be removed from or inserted into the holder. A truncated cone (60) is molded into an inside surface (58) of one cover (18) of the holder and rings (52, 56) are molded into this surface and the inside surface (54) of the opposite cover (20). This cone/ring assembly holds the seated disc it in place. Guide rails (64, 66) are formed on the same side of the cover as the living hinge to guide the disc during its insertion and removal. The holder allows the user to extract a disc for play or store it after play using only one hand.

24 Claims, 9 Drawing Sheets

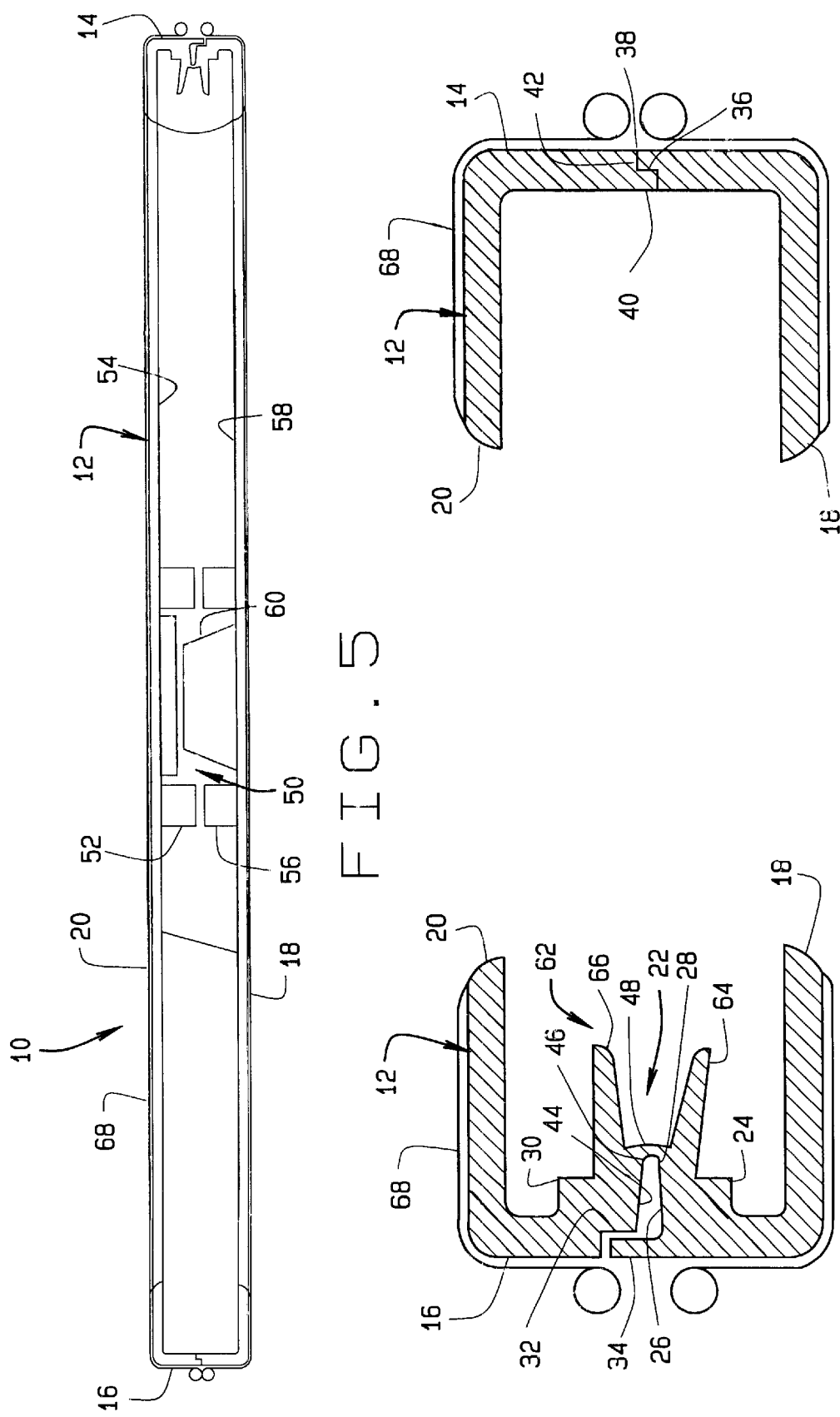

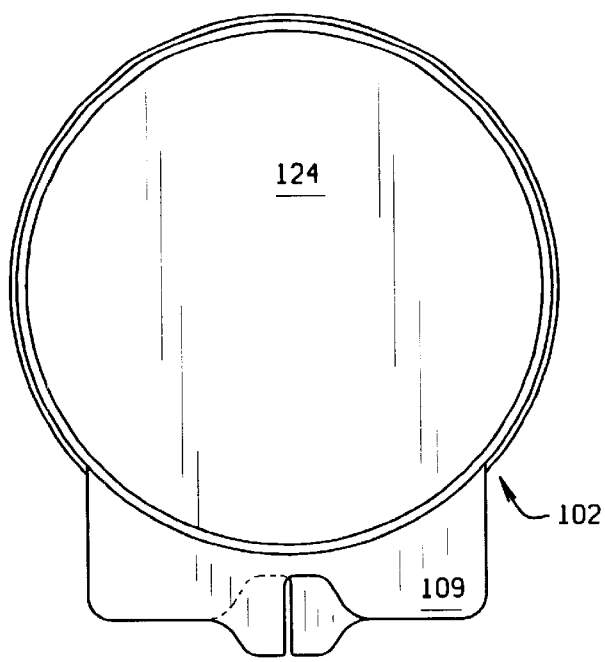
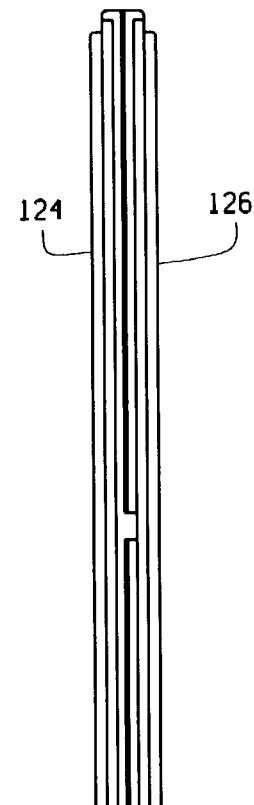
FIG. 12
FIG. 13A
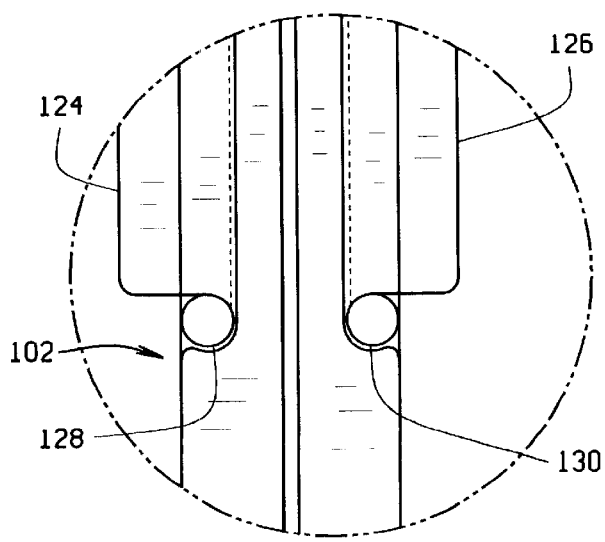
FIG. 13B

CONTAINER WITH HINGED COVER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to containers for holding small, generally flat articles such as compact discs (CD's) or digital video discs (DVD's), and more particularly, to a such a container for such discs. The container is advantageous in that while it securely holds a stored disc, it can also be operated with one hand to release the disc.

CD's and DVD's are generally flat, circular plates which, when inserted in an appropriate player, play music or a video. For maximum playability, the discs are kept in a holder which protects them from damage if dropped, dirt and dust, and scratching. The holder is typically an injection molded plastic piece with a crease or indentation formed therein as a fold line about which the two sides of the holder are formed. Since CD's and DVD's are of a standard size, the interior of the sidewalls of the holder can be appropriately formed to seat the disc when placed in the holder.

There are a number of different holder constructions which have been used to secure a disc within the holder. While these holders protect the disc and reduce their susceptibility to damage from scratching or other misuse, the holders are not necessarily "user friendly" so that one can readily remove a disc from holder or replace it. In particular, there are certain instances when it would be helpful to be able to remove or replace the disc without having to open the holder cover to retrieve of replace the disc.

BRIEF SUMMARY OF THE INVENTION

Among the several objects of the present invention may be noted the provision of a holder for CDs and DVDs which not only protects the disc but allows it to be easily retrieved for play and replaced for storage;

the provision of such a holder made of a plastic material and employing a "living" hinge formed along one inside edge of the holder, the living hinge making it easy to open and close the holder to retrieve and replace discs;

the provision of such a holder by which a CD or DVD is extracted by pushing on the sides of the holder thereby causing a gap to open along one side of the holder, the gap being sufficiently wide to remove the disc from the holder or to replace it in the holder;

the provision of such a holder which enables the user to remove and replace discs using only one hand, the holder including an internal guide structure which facilitates movement of the disc into and out of the holder;

the provision of such a holder in which a disc is firmly held in place when fitted into the holder, the holder having a ring and truncated cone assembly integrally molded onto opposed inside surfaces of the holder, the ring and cone bearing against respective surfaces of the disc to hold it firmly in place;

the provision of such a holder to be encased in a cover bearing graphics and text relating to the disc and its contents, the cover not effecting the ability of a user to open and close the holder;

the provision of such a holder which can be round or rectangular in shape and is available in different sizes; and, the provision of such a holder which is low cost and relatively easy to manufacture.

In accordance with the invention, generally stated, a holder for CDs, DVDs and the like includes a plastic molded container sized to accommodate the discs. Along one side of the container, on an inner wall thereof, a living hinge is formed. The opposite side of the container has an interlocking surface. At one end of the container, a slit is formed which extends between the two above described sides. By pressing against the sides of the container this slit forms a gap sufficiently wide for a disc to be removed from or inserted into the holder. A truncated cone is molded into the inside surface of one cover of the holder and a ring is molded into the inside surface of the opposite cover. The cone/ring assembly compress against opposite sides of a disc seated in the holder to hold it in place. Guide rails are formed on the same side of the cover as the living hinge to guide the disc during its insertion and removal. The holder allows the user to extract a disc for play or store it after play using only one hand. Other objects and features will be in part apparent and in part pointed out hereinafter.

BRIEF DESCRIPTION OF THE SEVERAL VIEWS OF THE DRAWINGS

In the drawings.

FIG. 5 is a sectional view of the holder;

FIG. 6 is a partial sectional view of one side of the holder showing a living hinge and disc guide assembly;

FIG. 7 is a partial sectional view of an opposite side of the holder;

FIG. 12 is a plan view of the holder with a metal cover installed on it;

FIG. 13A is a side elevational view of the holder with the cover installed and FIG. 13B is an enlarged partial elevational view of the holder showing how the cover attaches to the holder;

Corresponding reference characters indicate corresponding parts throughout the drawings.

DETAILED DESCRIPTION OF THE INVENTION

Figure 1:
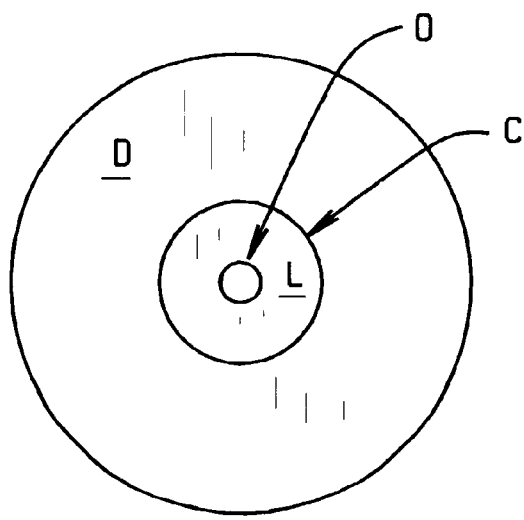
FIG. 1 is a plan view of CD/DVD disc.

Referring to the drawings, a disc D shown in FIG. 1, is representative of a compact disc (CD) or a digital video disc (DVD). A DVD is typically larger in diameter than a CD, but both discs need to be properly stored in order to prevent damage to them. Both discs also include a central, circular area C on which there is no data or information. This areas does have usually have a label L applied to it containing information about the contents of the disc. The disc also has a central opening O which is ½ inch in diameter.

Figure 2:
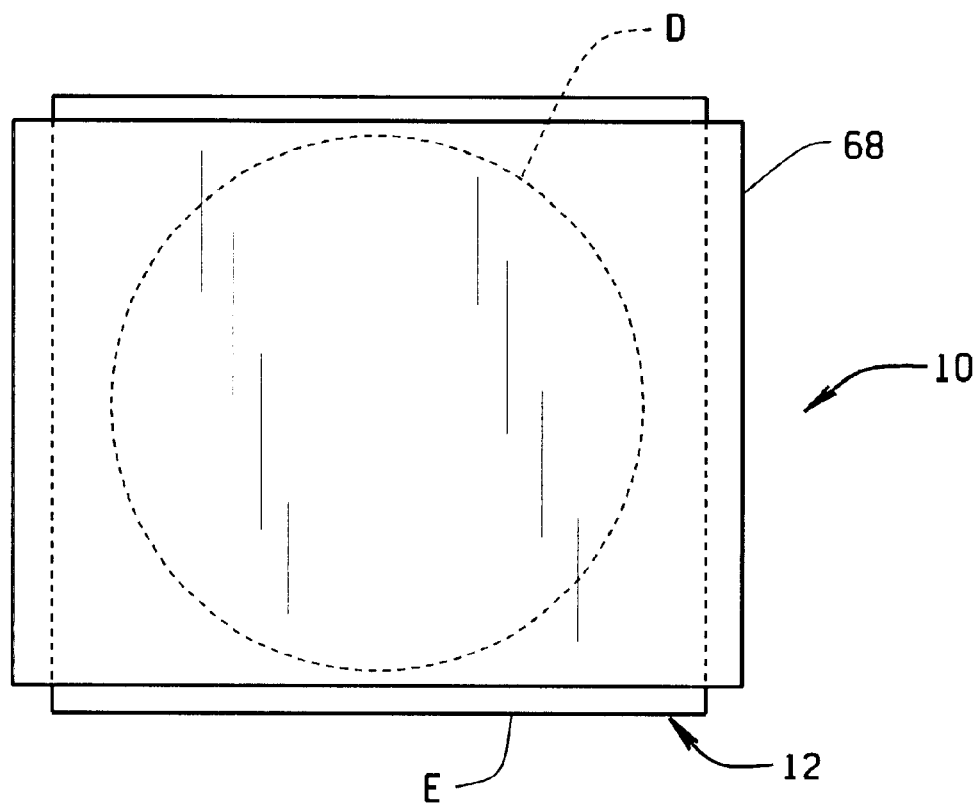
FIG. 2 is a view of a holder of the present invention encased in a cover.

Referring to FIG. 2, a holder 10 of the present invention is for conveniently discs D and for enabling the disc user to easily remove discs for play or insert them for storage. Holder 10 is available in different sizes to accommodate the different size discs. As described hereinafter, the design and construction of holder 10 makes it very useful for use in a car or in walking and other activities such as biking or sailing. Holder 10 includes a box or container 12 which is made of a molded plastic material forming opposed cover plates between which a disc is placed for storage. While the container 12 shown in FIG. 2 is generally rectangular in shape, the container can also be circular or of other shapes. As shown in the enlarged sectional views of FIGS. 6 and 7, sidewalls 14, 16 of container 12 are formed by interlocking sides of the respective cover plates 18, 20 of the container. Each cover is generally U-shaped when viewed in elevation having a large, flat center section and upwardly (or downwardly) turned side sections which form the sidewalls. The ends of these side sections are matingly contoured as shown in FIGS. 6 and 7 so the covers interfit with each other to form the sidewalls of the container.

Figure 3:
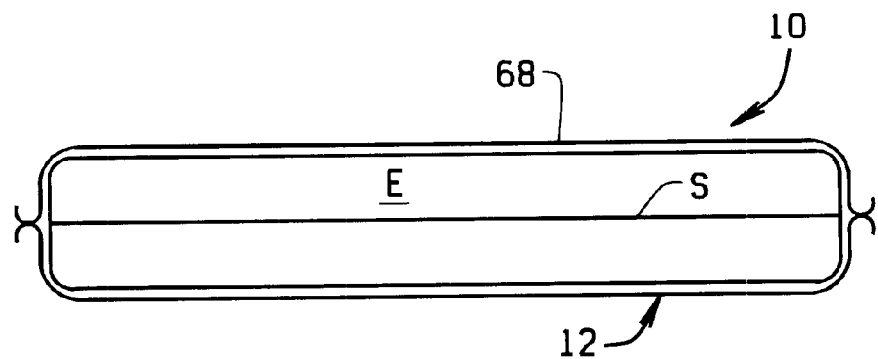
FIG. 3 is an end elevational view of the holder in its closed position.
Figure 4:
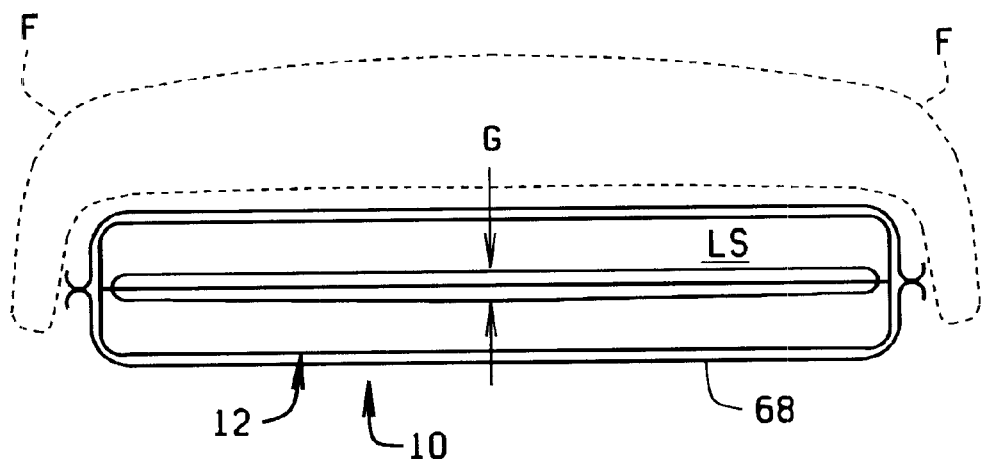
FIG. 4 is a similar view of the holder in which the sides are compressed to form a gap in the end of the holder to remove or insert a disc.
Figure 8A:
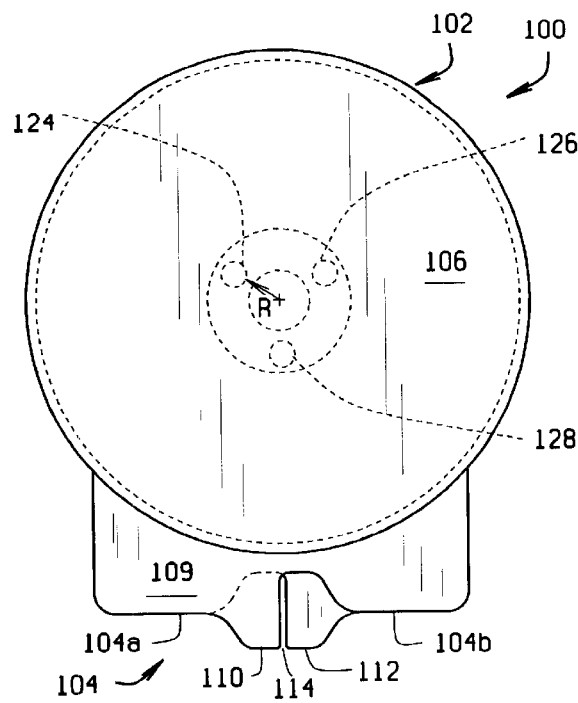
FIGS. 8 and 8B are respective top and bottom plan views of a second embodiment of the holder.

It is a feature of holder 10 that it is designed and constructed to open at one end E of the container only and by as small a gap G as 1/16 inch, so a user can insert or take out a disc D by sliding it out of the holder. As shown in FIG. 3, a slit is formed in end E of container 12 and extends the width of holder 10. As shown in FIG. 4, the user presses on the sides of the holder between two fingers F of one hand. This allows the user to slide the CD or DVD out of the holder into the user's lap or on another surface without the user having to use their other hand. This is possible by use of a "living" hinge indicated generally 22 formed on the inside of container 12 and particularly shown in FIG. 6. As shown therein, the upwardly turned end section of cover 18 has an inward extension 24. The upper end of this extension forms a generally flat surface 26. At the inner end of this surface is formed an arcuate shaped flap 28. The downwardly turned end section of cover 20 has an inward extension 30. At the outer end of extension 30 is a notch 32 extending the length of sidewall 16. A flange 34 of the end section of cover 18 fits in this notch to form the interlocking arrangement by which covers 18, 20 interfit with each other. As shown in FIG. 7, on the opposite side of the container, the upwardly turned end section of cover 18 has a notch 36 formed adjacent its inner surface, and a flange 38 outwardly thereof. The downwardly turned end section of cover 20 has the opposite construction with an inner flange 40 that fits in notch 36, and an outer notch 42 in which flange 38 fits; this construction forming a latching arrangement for the container.

Referring again to FIG. 6, the lower end of extension 30 defines a canted or sloped surface 44. This creates a gap between surface 44 of cover 20 and surface 26 of cover 18. At the inner end of surface 44 a notch 46 is formed in which a distal end 48 of flap 28 is received. When pressure is placed on the covers 18, 20 of the container, as when a user squeezes the covers, cover 20 rotates about the hinge formed by the flap 28, notch 46 arrangement. This allows the center section of the covers to flex away from each other forming the gap G shown in FIG. 4. As noted, the gap is sufficiently wide that a stored disc readily slides out of the holder or a disc can be slid into the holder.

Although not shown in the drawings, it will be understood by those skilled in the art that hinge 22 can also be located on the outside of the container. Further, while hinge 22 extends the full length of container 12 along the inner surface of sidewall 16 of the container, the length of the hinge does not have to be this long in order to effect the desired operation above described.

Referring to FIG. 5, holder 10 further includes means indicated generally 50 for holding a disc in place when stored in the container. When stored in holder 10, the CD or DVD rests inside container 12 at a position approximately one-half the inside height of the holder. Means 50 includes a ring-shaped projection 52 formed on the inside surface 54 of cover 20. The ring surrounds the opening O formed in the center of the disc. As noted, this area is generally blank and does not have any music or video on it. An identical ring 56 is integrally molded on inner surface 58 of cover 18 so the two rings sandwich the disc between them to hold the disc firmly in position. To further insure that the disc is completely secure and cannot move around in the container, a projection 60, also integrally molded into the inner surface of a cover, is in the shape of a truncated cone. Cone 60 extends through opening O in the center of the disc when the disc is in place to hold it in position.

Referring again to FIG. 6, holder 10 further includes a guide means 62 for guiding movement of the disc into and out of the holder. Means 62 includes first and second guide rails 64, 66 which are respectively formed on the inner ends of projections 24 and 30 and extend inwardly into container 12. These fingers extend inwardly at an angle to a horizontal centerline through the container to facilitate movement of the disc. The fingers can extend the length of sidewall 16, or they can extend only partially along the length of the sidewall, beginning at the end of the container where gap G is formed and extending toward the other end of the container.

Holder 10 fits in a sleeve 68. The sleeve can be of flexible metal or plastic material. Graphic or textual material can be printed on the sleeve to indicate the contents of the disc. As shown in FIG. 4, when a user wishes to open the holder, they press against the sides of the sleeve in order to flex the sidewalls of holder 10 and open gap G so a disc can be removed from the holder or inserted into it.

FIGS. 8A–13B illustrate a second embodiment of the holder indicated generally 100. Holder 100 comprises a generally circular container 102 for holding CD's, for example. The container includes a living hinge 104 formed between cover plates forming top and bottom sides 106, 108 of the container. Hinge 104 is formed at the outer end of a tongue 109 which extends outwardly from the backside of the container. The living hinge in this embodiment has two sections indicated 104a, 104b respectively. Container 102 is preferably formed of a plastic material and a central portion 114 of the plastic material between hinge sections 104a, 104b forms a hollow, compressible section 110 integrally molded in the top portion of the tongue and a hollow, compressible section 112 integrally molded in the bottom portion of the tongue. As shown in FIG. 9A, sections 104a, 104b of the living hinge do not extend through central portion 114 of tongue 109. The hollow sections 110 and 112 formed in tongue 109 are compressible by a user of the holder to flex the living hinge and open the container to extract a CD. Importantly, the user can compress this portion of the container using only one hand so the other hand is free to grasp the disc to remove it from, or insert it back into the holder. Opening of the container is facilitated by lips 115a, 115b formed in the respective upper and lower halves of container 102 at the front of the container opposite tongue 109.

Figure 10A:
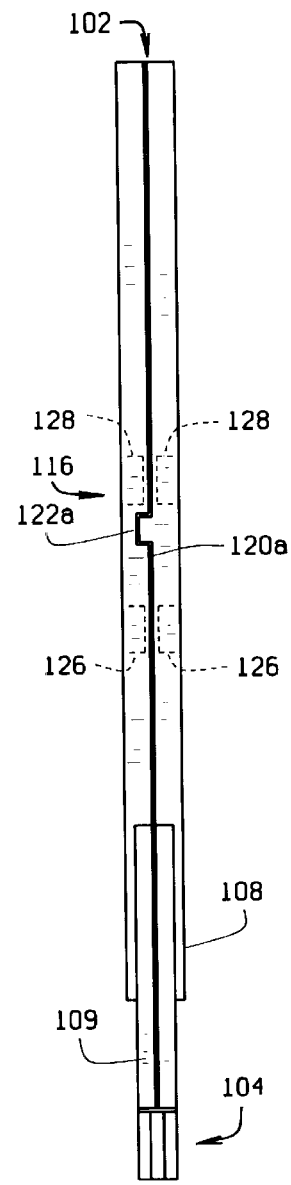
FIGS. 10A are 10B are respective side elevational views of holder.
Figure 9A:
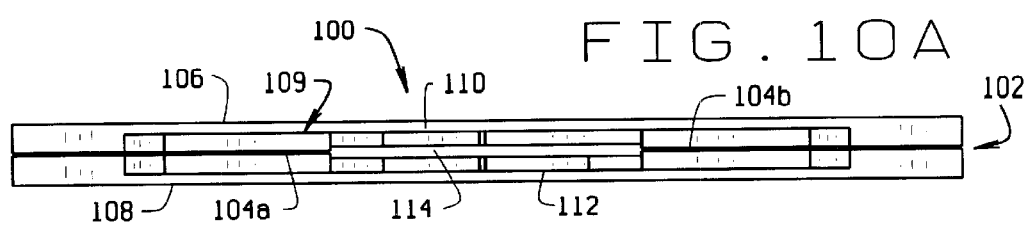
FIGS. 9A and 9B are front and rear elevational views of the holder.
Figure 8B:
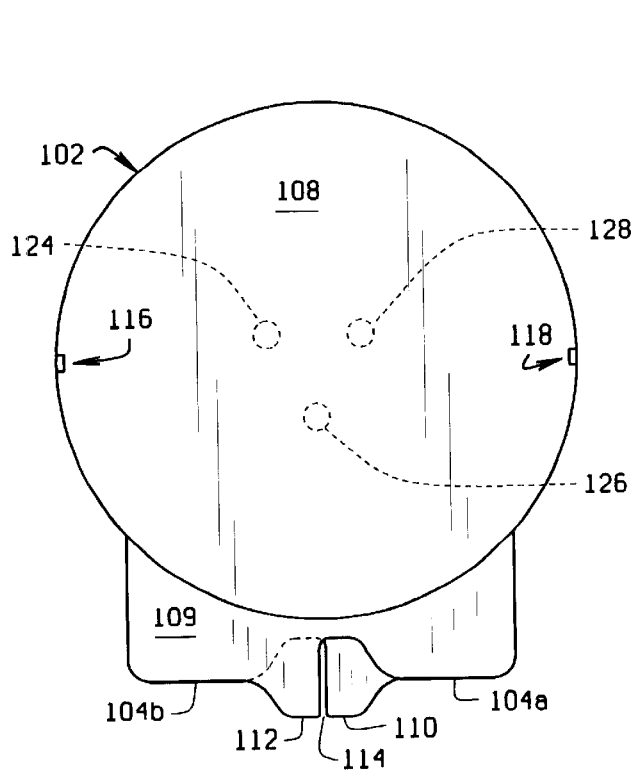
Figure 10B:
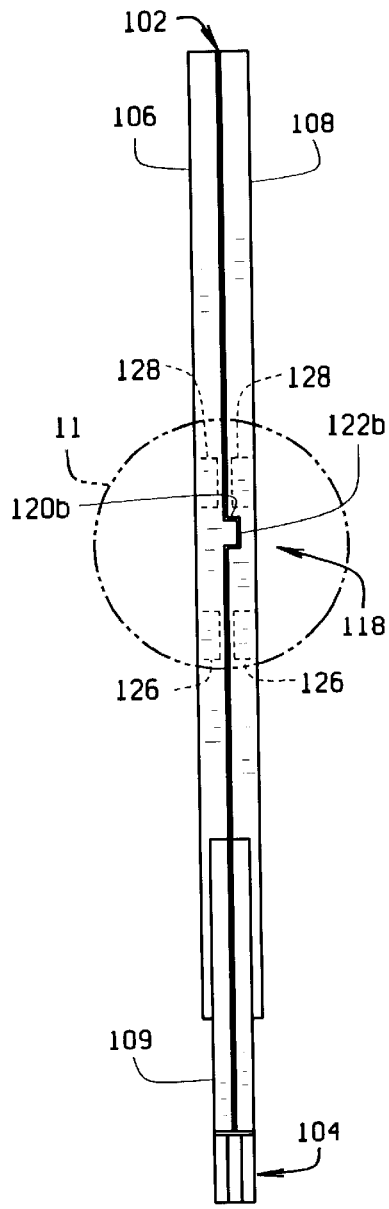
Figure 11:
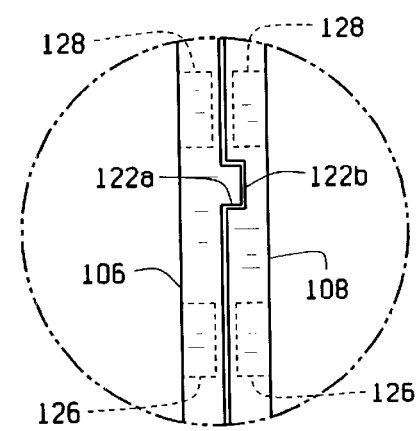
FIG. 11 is an enlarged partial elevational view of a locking mechanism of the holder.
Figure 9B:
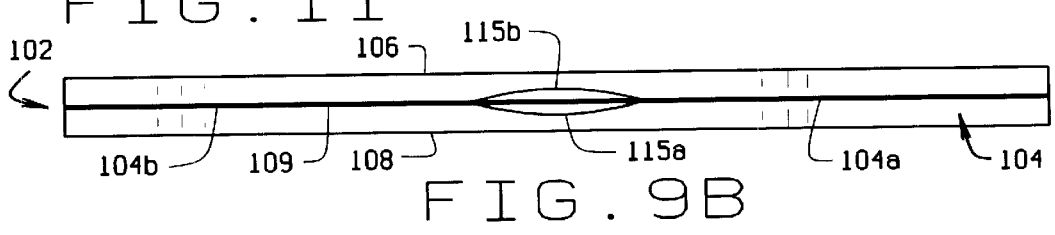
Figure 14A:
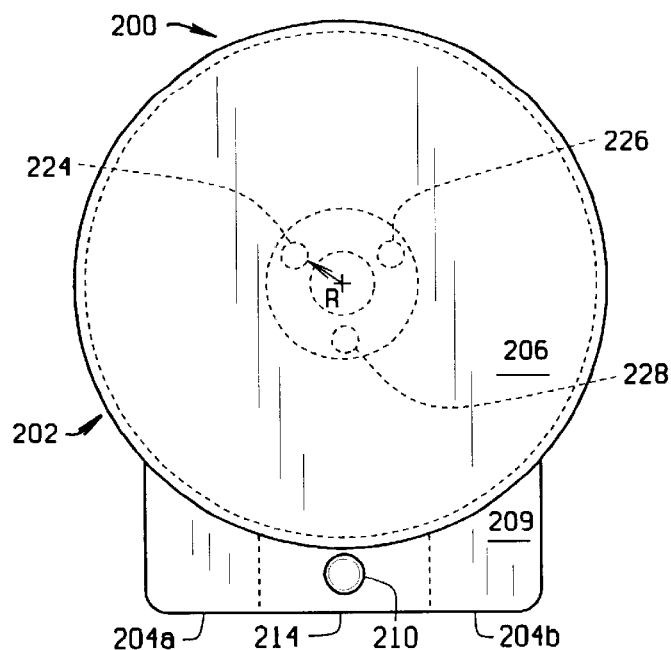
FIGS. 14A and 14B are respective top and bottom plan views of a third embodiment of the holder.
Figure 14B:
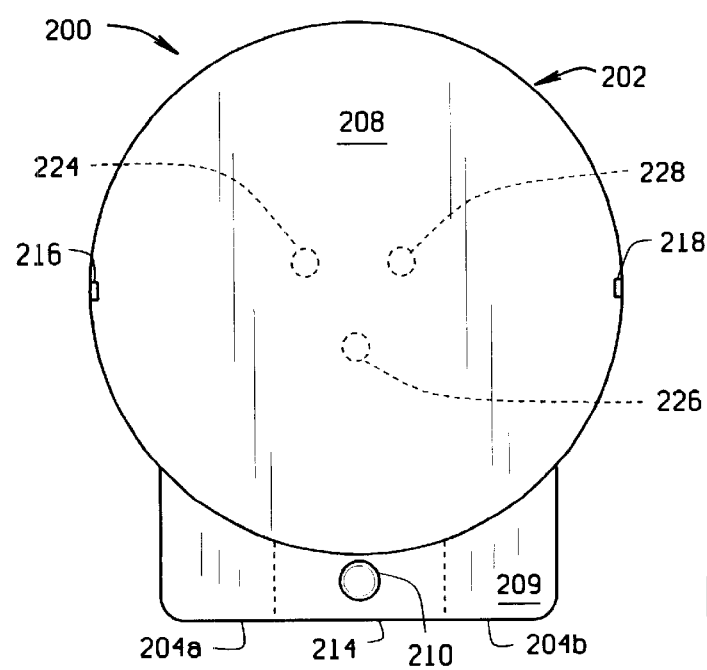
Figure 16A:
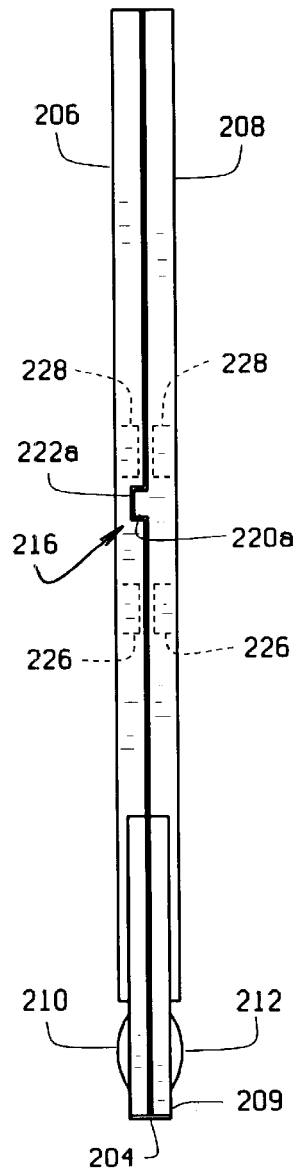
FIGS. 16A ad 1B are respective side elevational views of holder.
Figure 15A:
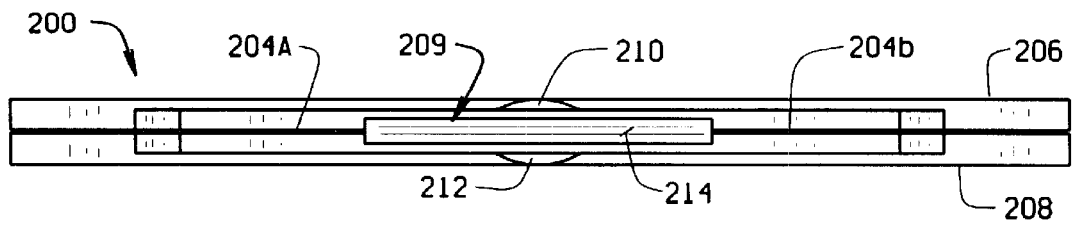
FIGS. 15A and 15B are front and rear elevational views of the holder.
Figure 15B:
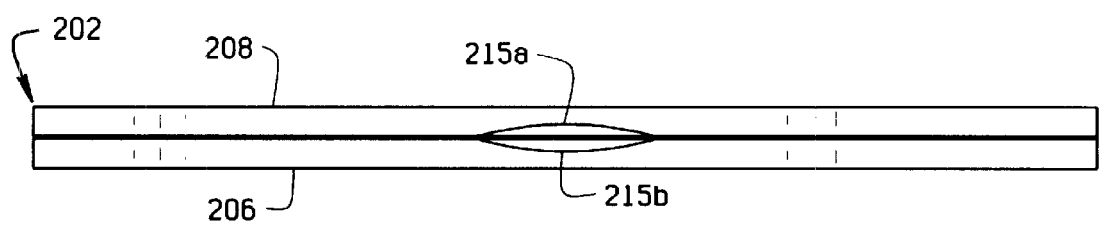
Figure 17:
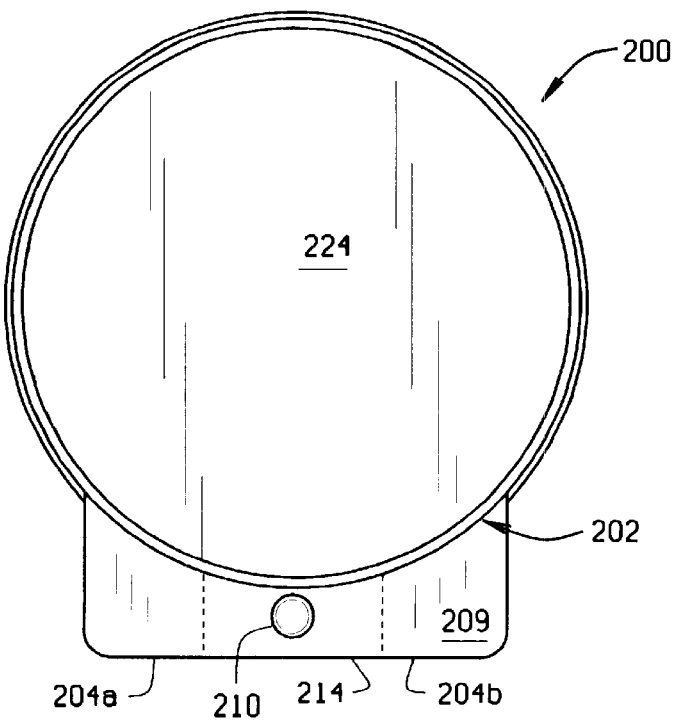
FIG. 17 is a plan view of the holder with a metal cover installed on it; and, FIG. 18 is a side elevational view of the holder with the cover installed.
Figure 16B:
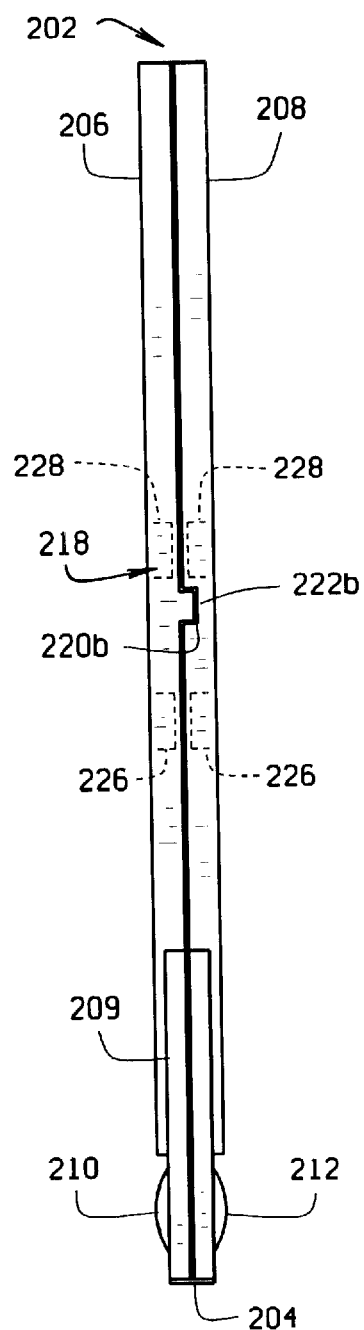
Figure 18:
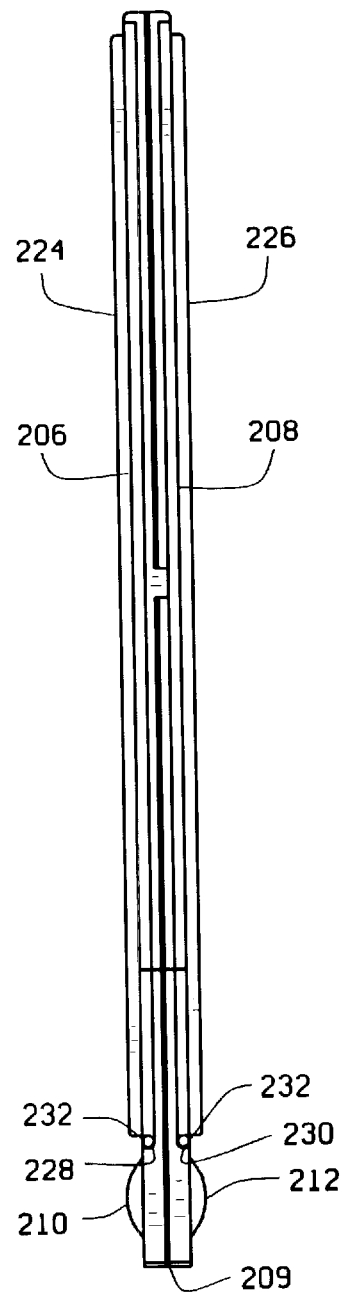

Besides the lips 115a, 115b formed in the upper and lower halves of the container, the container further has locking elements indicated generally 116, 118 integrally formed along opposite sides of the container. As shown in FIGS. 10A, 10B, and 11, locking elements 116, 118 each include a tab 120 and a notch 122. On the one side of the container shown in FIG. 10A, a generally rectangularly shaped tab 120a projects upwardly from side 108 of the container and fits into a correspondingly shaped notch 122a formed in side 106. On the opposite side of the container shown in FIGS. 10B and 11, a generally rectangularly shaped tab 120b projects downwardly from side 106 of the container and fits into a correspondingly shaped notch 122b formed in side 108. Lips 115a and 115b aid in opening container 102 with both hands as an alternate method of removing and replacing a CD or DVD. Locking elements 116 and 118 prevent the container from opening if it falls.

Support of a CD or DVD within container 102 is by pins 124, 126, and 128. Each pin includes an upper and lower pin section respectively molded in the top and bottom sections 106, 108 of the container. The pins are located 120° apart from each other and there is a space between the outer ends of the respective posts corresponding to the thickness of the CD. As indicated by the dashed line circle in FIG. 8A, the pins are positioned radially outwardly from the center of the container a distance R. This distance is greater than the radius of the center opening in the CD, but less than the distance between this opening and the working area of the CD.

As noted, when a user pinches the center section of tongue 109, areas 110, 112 are compressed, and the upper and lower halves 106, 108 of the container open about hinge sections 104a, 104b. This causes the tabs 120a, 120b to move with respect to their associated notches 122a, 122b, unlocking the container. A gap is now formed between the two halves of the container, this gap being, for example, $\frac{1}{8}^{th}$ inch. This allows a CD to be removed from, or replaced in the container. Releasing the pressure on the areas 110, 112 now allows the container to close when pressed in the center or over the locking tabs.

FIGS. 12, 13A and 13B, illustrate container 102 with metal covers 124, 126 attached to the respective halves 106, 108 of the container. Each container half has a groove 128, 130 respectively which extends generally about the periphery of the container. The size of the grooves are such that an end curl portion 132 of the respective metal covers 124, 126 frictionally fit within the grooves to hold the metal covers in place when the outer curl end of the covers are pushed into the grooves.

FIGS. 14A–18 disclose another embodiment of a CD/DVD holder of the present invention, this embodiment indicated generally 200 in the drawings. Holder 200 includes a container 202 which is basically similar in design to the container 102 previously described. That is, container 202 includes a living hinge 204 formed between cover plates 206, 208 of the container, the hinge being formed at the outer end of a tongue 209 which extends outwardly from the backside of the container. Container 202, like containers 12 and 102 is made of a plastic material. Container 202 differs from container 102 in that center rear section 214 of tongue 209 does include lips such as are found in the other embodiment. Rather, when the holder is being molded, upper and lower dome shaped protrusions 210, 212 are formed in the body of the tongue. These dome shaped protrusions are opposed to each other as shown in the drawings. When a user presses his fingers against these protrusions to compress them, the upper and lower halves of container 202 separate from each other. The resulting gap now allows the user to extract a CD/DVD from the container, or replace the disc in the container. Again, opening the container only requires the use of one hand. Opening of the container is facilitated by lips 215a, 215b formed in the respective upper and lower halves of container 202 when one opens the container using both hands.

Container 202 includes locking elements 216, 218 integrally formed along opposite sides of the container. As before, the locking elements each include a tab 220 and notch 222. The tabs and notches are formed in the same manner as previously described with respect to container 102 and will not be described in detail. The locking elements again aid in opening container 202 with both hands as an alternate method of removing and replacing a CD or DVD.

Support of a CD or DVD within container 202 is by pins 224, 226, and 228 each of which includes an upper and lower pin section respectively molded in the top and bottom sections 206, 208 of the container. As in container 102, the pins are located 120° apart from each other and there is a space between the outer ends of the respective posts corresponding to the thickness of the CD/DVD. As shown by the dashed line circle in FIG. 14A, the pins are positioned radially outwardly from the center of the container a distance R; this distance being greater than the radius of the center opening in the CD, but less than the distance between this opening and the working area of the CD.

Finally, metal covers 224, 226 attach to respective halves 206, 208 of the container. Each container half has a groove 228, 230 respectively extending about the periphery of the container. The size of the grooves are such that an end curl portion 232 of the respective metal covers frictionally fit within the grooves to hold the metal covers in place when the outer curl end of the covers are pushed into the grooves.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

I claim:

1. A holder for CD and DVD discs comprising:
    a container sized to accommodate a disc and including first and second opposed cover plates having inner surfaces between which the disc is held;
    an opening formed between the plates which can be opened to extract the disc from the container or replace the disc in the container;

a living hinge extending between the plates opposite the opening to move of the plates relative to each other to open and close the opening;

flexing means for flexing the living hinge to move the plates surfaces and open the container, moving the plates forming a gap in the opening sufficiently wide for the disc to be removed from or inserted into the holder, and the flexing means allowing a user of the holder to extract the disc from the holder for play or store the disc in the holder after play using only one hand; and, means holding the disc in place when stored in the container and including a cone formed on an inside surface of one cover plate and rings formed on the same inside surface as the cone and on an inside surface of the opposite cover plate.

2. The holder of claim 1 wherein the container is made of a plastic, molded material.

3. The holder of claim 2 in which the container is made in different sizes for storing different size discs.

4. The holder of claim 1 wherein the cone is a truncated cone having a generally flat surface bearing against one side of the disc, the cone and pressing against opposite sides of a disc seated in the holder to hold the disc in place.

5. The holder of claim 4 further including guide means for guiding the disc into and out of the holder.

6. The holder of claim 5 wherein the guide means includes a guide rail formed on an inner sidewall of the cover plates.

7. The holder of claim 6 further including a second guide rail formed the same side of the cover plates as the first guide rail, the guide rails being spaced apart from each other to form a slot in which the disc is received to guide movement of the disc.

8. The holder of claim 7 wherein the guide rails are formed adjacent the living hinge on the same inner sidewall surface and extend the length of the sidewall.

9. The holder of claim 1 further including a sleeve into which the holder fits, the sleeve have graphic and textual material imprinted thereon describing the disc and its contents.

10. The holder of claim 1 further including a tongue projecting from the container, the living hinge being formed on the tongue.

11. The holder of claim 10 wherein the flexing means is formed on the tongue.

12. The holder of claim 11 further including a plurality of posts for holding a disc in place within the container, the posts each including a section extending from an inner surface of one of the cover plates.

13. A holder for CD and DVD discs comprising:

a container sized to accommodate a disc;

a living hinge formed along one sidewall of the container along an inner surface thereof;

an interlocking surface formed along an opposite sidewall of the container;

an endwall extending between the respective sidewalls and in which a slit is formed, pressing against the sidewalls of the container compressing the container and opening the slit to form a gap sufficiently wide for a disc to be removed from or inserted into the holder, whereby a user of the holder can extract a disc from the holder for play or store the disc in the holder after play using only one hand;

guide means for guiding the disc into and out of the holder; and, means for holding the disc in place when stored in the container, and including a cone formed on an inside surface of one cover of the holder and rings formed on the same inside surface as the cone and on an inside surface of the opposite cover.

14. The holder of claim 13 wherein the container is made of a plastic, molded material and is made in different sizes to store different size discs.

15. The holder of claim 14 wherein the cone is a truncated cone having a generally flat surface bearing against one side of the disc, the cone and pressing against opposite sides of a disc seated in the holder to hold the disc in place.

16. The holder of claim 15 wherein the guide means includes first and second guide rails formed on an inner sidewall of the cover, the guide rails being spaced apart from each other to form a slot in which the disc is received to guide movement of the disc.

17. The holder of claim 16 wherein the guide rails are formed adjacent the living hinge on the same inner sidewall surface and extend the length of the sidewall.

18. The holder of claim 17 further including a sleeve into which the holder fits, the sleeve have graphic and textual material imprinted thereon describing the disc and its contents.

19. A holder for CD and DVD discs comprising:

a container sized to accommodate a disc and including first and second opposed cover plates having inner surfaces between which the disc is held;

an opening formed between the plates which can be opened to extract the disc from the container or replace the disc in the container;

a tongue projecting from the container and a living hinge formed on the tongue and extending between the plates opposite the opening to move of the plates relative to each other to open and close the opening;

flexing means formed on the tongue for flexing the living hinge to move the plates surfaces and open the container, moving the plates forming a gap in the opening sufficiently wide for the disc to be removed from or inserted into the holder, and the flexing means allowing a user of the holder to extract the disc from the holder for play or store the disc in the holder after play using only one hand; and, a separate hollow, compressible section integrally molded into top and bottom portions of the tongue, the hollow sections being compressed by a user of the holder to flex the living hinge and open the container to extract a CD.

20. The holder of claim 19 wherein the tongue has a central portion with respective sections of the living hinge being formed on opposite sides of said central portion.

21. The holder of claim 19 further including lips formed in the respective cover plates opposite the tongue.

22. The holder of claim 20 further including separate hollow, compressible domes integrally molded into top and bottom portions of the tongue, the domes sections being compressed by a user of the holder to flex the living hinge and open the container to extract a CD.

23. The holder of claim 22 further including lips formed in the respective cover plates opposite the tongue.

24. The holder of claim 19 further including a plurality of posts for holding a disc in place within the container, the posts each including a section extending from an inner surface of one of the cover plates.

* * * * *